US009475133B2

(12) United States Patent
Koga

(10) Patent No.: US 9,475,133 B2
(45) Date of Patent: Oct. 25, 2016

(54) CUTTING INSERT, CUTTING TOOL, AND METHOD OF MANUFACTURING MACHINED PRODUCT USING THE SAME

(75) Inventor: Kenichirou Koga, Yasu (JP)

(73) Assignee: Kyocera Corporation, Kyoto (JP)

( * ) Notice: Subject to any disclaimer, the term of this patent is extended or adjusted under 35 U.S.C. 154(b) by 224 days.

(21) Appl. No.: 14/126,300

(22) PCT Filed: Apr. 27, 2012

(86) PCT No.: PCT/JP2012/061391
§ 371 (c)(1),
(2), (4) Date: Dec. 13, 2013

(87) PCT Pub. No.: WO2013/001907
PCT Pub. Date: Jan. 3, 2013

(65) Prior Publication Data
US 2014/0126974 A1 May 8, 2014

(30) Foreign Application Priority Data
Jun. 30, 2011 (JP) .................. 2011-146250

(51) Int. Cl.
*B23C 5/02* (2006.01)
*B23C 5/20* (2006.01)
(Continued)

(52) U.S. Cl.
CPC .............. *B23C 5/205* (2013.01); *B23B 27/143* (2013.01); *B23C 5/06* (2013.01); *B23C 5/207* (2013.01);
(Continued)

(58) Field of Classification Search
CPC .................. Y10T 407/1908; Y10T 407/1924; Y10T 407/1936; Y10T 407/1946; Y10T 407/1952; Y10T 407/1962; Y10T 407/23; B23C 2200/0411; B23C 2200/286; B23C 2210/045; B23C 5/06; B23C 5/205; B23C 5/207; B23C 5/00; B23C 5/165
USPC ................... 407/34, 42, 48, 53, 56, 61, 113
See application file for complete search history.

(56) References Cited

U.S. PATENT DOCUMENTS

| 5,544,984 A * | 8/1996 | Pantzar .................. B23C 5/207 407/113 |
| 5,807,031 A | 9/1998 | Arai et al. |

(Continued)

FOREIGN PATENT DOCUMENTS

| DE | 102008016732 B3 * | 6/2009 | ............ B23C 5/109 |
| EP | 2450139 A1 | 5/2012 | |

(Continued)

OTHER PUBLICATIONS

Extended European Search Report Dated Feb. 6, 2015 for European Application No. 12803557.3.
(Continued)

*Primary Examiner* — Daniel Howell
*Assistant Examiner* — Nicole N Ramos
(74) *Attorney, Agent, or Firm* — Volpe and Koenig, P.C.

(57) ABSTRACT

In a cutting insert according to an embodiment, an upper cutting edge includes, sequentially from a first corner to a second corner, a corner cutting edge, a minor cutting edge inclined as separating from the corner cutting edge at a first inclination angle on a basis of a vertical plane perpendicular to a central axis extending between upper and lower surfaces, and a major cutting edge inclined as separating from the minor cutting edge at a second inclination angle on the basis of the vertical plane so as to become more closer to the lower surface than the minor cutting edge. A cross section of a rake surface obtained by cutting an inwardly located end portion thereof along a direction of the central axis has a straight line shape or concave shape in a region crossing over at least a minor rake surface and a major rake surface.

15 Claims, 11 Drawing Sheets

(51) Int. Cl.
*B23C 5/06* (2006.01)
*B23B 27/14* (2006.01)

(52) U.S. Cl.
CPC .. *B23C 2200/0411* (2013.01); *B23C 2200/286* (2013.01); *B23C 2210/045* (2013.01); *Y10T 407/2268* (2015.01); *Y10T 407/23* (2015.01); *Y10T 407/235* (2015.01); *Y10T 409/303808* (2015.01)

(56) References Cited

U.S. PATENT DOCUMENTS

| | | | |
|---|---|---|---|
| 5,810,521 A * | 9/1998 | Pantzar | B23B 27/145 407/114 |
| 5,876,154 A * | 3/1999 | Enderle | B23B 27/141 407/113 |
| 6,196,770 B1 | 3/2001 | Astrom et al. | |
| 8,157,489 B2 * | 4/2012 | Wolf | B23B 27/141 407/113 |
| 2001/0051077 A1 | 12/2001 | Nagata et al. | |
| 2007/0003384 A1 * | 1/2007 | Smilovici | B23C 5/2221 407/113 |
| 2007/0071559 A1 * | 3/2007 | Koskinen | B23B 27/16 407/34 |
| 2008/0304924 A1 * | 12/2008 | Engstrom | B23C 5/202 407/114 |
| 2009/0238649 A1 * | 9/2009 | Kruszynski | B23B 27/141 407/40 |
| 2010/0080662 A1 | 4/2010 | Satran et al. | |
| 2010/0202839 A1 | 8/2010 | Fang et al. | |
| 2010/0221076 A1 | 9/2010 | Takahashi et al. | |
| 2012/0128440 A1 * | 5/2012 | Ishi | B23C 5/006 409/132 |
| 2014/0076117 A1 * | 3/2014 | Shibata | B23C 5/06 83/13 |
| 2014/0314509 A1 * | 10/2014 | Yamamichi | B23C 5/207 409/132 |
| 2015/0190868 A1 * | 7/2015 | Koifman | B23C 5/207 407/11 |

FOREIGN PATENT DOCUMENTS

| | | | |
|---|---|---|---|
| JP | 08323510 A | * | 12/1996 |
| JP | 11333616 A | | 12/1999 |
| JP | 2002046010 A | | 2/2002 |
| JP | 2003275920 A | * | 9/2003 |
| JP | 2010142948 A | * | 7/2010 |
| JP | 2010523352 A | | 7/2010 |
| JP | 2010228053 A | * | 10/2010 |
| JP | 2011093043 A | | 5/2011 |
| WO | 2007142224 A1 | | 12/2007 |
| WO | WO2011024595 | * | 3/2011 |

OTHER PUBLICATIONS

International Search Report, PCT/JP2012/061391, Jun. 4, 2012, 5 pp.

* cited by examiner

CUTTING INSERT, CUTTING TOOL, AND METHOD OF MANUFACTURING MACHINED PRODUCT USING THE SAME

FIELD OF INVENTION

The present invention relates to a cutting insert, a cutting tool, and a method of manufacturing a machined product using the same.

BACKGROUND

Conventionally, as a cutting insert (hereinafter generally referred to as an "insert") for use in a face milling process, an insert configured so that major cutting edges 24 and 25 are gradually inclined downward as separating from a corner part has been proposed (for example, refer to Japanese Unexamined Patent Publication No. 11-333616).

However, according to the insert of Japanese Unexamined Patent Publication No. 11-333616, rake surfaces 35 and 36 located correspondingly to the major cutting edges 24 and 25 are flat surface shaped surfaces as shown in FIG. 7 and the like. Therefore, the chips generated by the major cutting edges 24 and 25 are discharged after passing through the flat surface shaped rake surfaces 35 and 36 while following the inclined shape of the major cutting edges 24 and 25. Consequently, the chips are less susceptible to stable curling, and hence the chips may extend long. As a result, there is a risk that surface quality of a target machining surface of a workpiece may be deteriorated due to chip biting between the insert and the workpiece.

Accordingly, there is a demand for an insert that reduces the foregoing chip biting and has excellent chip discharge performance.

SUMMARY

An object of the present invention is to provide a cutting insert and a cutting tool each having excellent chip discharge performance, as well as a method of manufacturing a machined product using the cutting insert and the cutting tool.

A cutting insert according to a first embodiment of the present invention includes: a polygonal shaped upper surface; a lower surface being identical in shape to the upper surface; a side surface connected to each of the upper surface and the lower surface; and an upper cutting edge located at an intersection of the upper surface and the side surface. The upper surface includes first and second corners adjacent to each other, and a rake surface continuous with the upper cutting edge. The upper cutting edge includes, sequentially from the first corner to the second corner, a corner cutting edge, a minor cutting edge inclined as separating from the corner cutting edge at a first inclination angle on a basis of a vertical plane perpendicular to a central axis extending between the upper and lower surfaces, and a major cutting edge inclined as separating from the minor cutting edge at a second inclination angle on the basis of the vertical plane so as to become more closer to the lower surface than the minor cutting edge. The rake surface includes a minor rake surface being continuous with the minor cutting edge and inclined as going inward at a first rake angle on the basis of the vertical plane so as to approach the lower surface, and a major rake surface being continuous with the major cutting edge and inclined as going inward at a second rake angle on the basis of the vertical plane so as to approach the lower surface. A cross section of the rake surface obtained by cutting an inwardly located end portion thereof along a direction of the central axis has a straight line shape or concave shape in a region crossing over at least the minor rake surface and the major rake surface.

A cutting insert according to a second embodiment of the present invention includes: a polygonal shaped upper surface; a lower surface being identical in shape to the upper surface; a side surface connected to each of the upper surface and the lower surface; and an upper cutting edge located at an intersection of the upper surface and the side surface. The upper surface includes first and second corners adjacent to each other, and a rake surface continuous with the upper cutting edge. The upper cutting edge includes, sequentially from the first corner to the second corner, a corner cutting edge, a minor cutting edge inclined as separating from the corner cutting edge at a first inclination angle on a basis of a vertical plane perpendicular to a central axis extending between the upper and lower surfaces, and a major cutting edge inclined as separating from the minor cutting edge at a second inclination angle on the basis of the vertical plane so as to become more closer to the lower surface than the minor cutting edge. The rake surface includes a minor rake surface being continuous with the minor cutting edge and inclined as going inward at a first rake angle on the basis of the vertical plane so as to approach the lower surface, and a major rake surface being continuous with the major cutting edge and inclined as going inward at a second rake angle on the basis of the vertical plane so as to approach the lower surface. The first rake angle of the minor rake surface is larger at an end portion thereof located closer to the second corner than that at an end portion thereof located closer to the first corner, and the second rake angle of the major rake surface is larger at an end portion thereof located closer to the first corner than that at an end portion thereof located closer to the second corner.

A cutting tool according to an embodiment of the present invention includes the cutting insert of the foregoing embodiment, and a holder configured to attach the cutting insert thereto. A cutting section of the upper cutting edge extending from the first corner to the second corner in the cutting insert has a positive axial rake angle.

A method of manufacturing a machined product according to an embodiment of the present invention includes: rotating the cutting tool according to the foregoing embodiment on a basis of a rotation axis of the holder; bringing the upper cutting edge of the cutting tool being rotated into contact with a surface of a workpiece; and separating the cutting tool from the workpiece.

According to the cutting insert of the first embodiment of the present invention, the upper cutting edge includes, sequentially from the first corner to the second corner, the corner cutting edge, the minor cutting edge inclined as separating from the corner cutting edge at the first inclination angle on the basis of the vertical plane perpendicular to the central axis extending between the upper and lower surfaces, and the major cutting edge inclined as separating from the minor cutting edge at the second inclination angle on the basis of the vertical plane so as to become more closer to the lower surface than the minor cutting edge. The cross section of the rake surface obtained by cutting the inwardly located end portion thereof along the direction of the central axis has the straight line shape or concave shape in the region crossing over at least the minor rake surface and the major rake surface. Hence, convex-shaped chips generated by the region corresponding to the minor cutting edge and the major cutting edge of the upper cutting edge can be deformed into the straight line shape or concave shape in the process of passing through the rake surface. Therefore, excellent chip discharge performance is exhibitable by stably curling the chips in the following chip discharge process.

According to the cutting insert of the second embodiment of the present invention, the upper cutting edge includes, sequentially from the first corner to the second corner, the corner cutting edge, the minor cutting edge inclined as separating from the corner cutting edge at the first inclination angle on the basis of the vertical plane perpendicular to the central axis extending between the upper and lower surfaces, and the major cutting edge inclined as separating from the minor cutting edge at the second inclination angle on the basis of the vertical plane so as to become more closer to the lower surface than the minor cutting edge. The first rake angle of the minor rake surface is larger at the end portion thereof located closer to the second corner than that at the end portion thereof located closer to the first corner, and the second rake angle of the major rake surface is larger at the end portion thereof located closer to the first corner than that at the end portion thereof located closer to the second corner. Hence, convex-shaped chips generated by the region corresponding to the minor cutting edge and the major cutting edge of the upper cutting edge can be deformed into the straight line shape or concave shape in the process of passing through the rake surface. Therefore, the excellent chip discharge performance is exhibitable by stably curling the chips in the following chip discharge process.

DETAILED DESCRIPTION OF THE PREFERRED EMBODIMENTS

Cutting Insert

First Embodiment

A cutting insert according to a first embodiment of the present invention is described in details below with reference to FIGS. 1 to 4, taking the insert 1 having a hexagonal shape in a top view as an example.

Figure 1A:
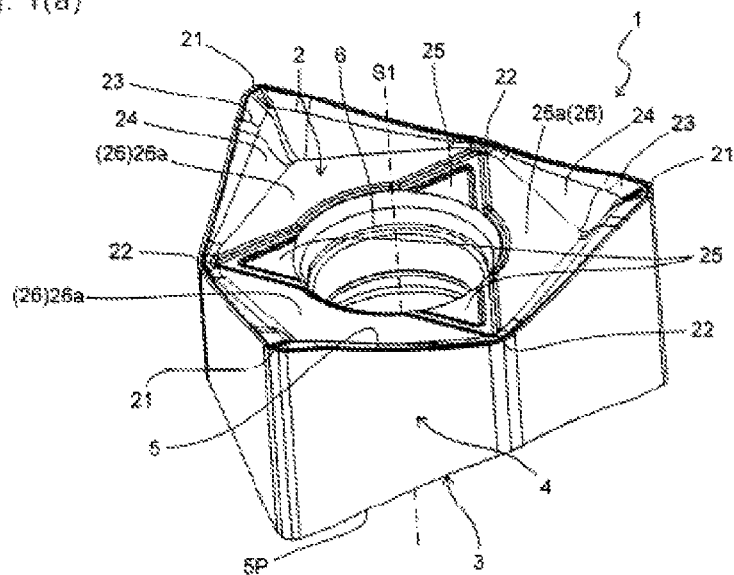
FIG. 1(a) is a perspective view of a cutting insert according to a first embodiment of the present invention.
Figure 1B:
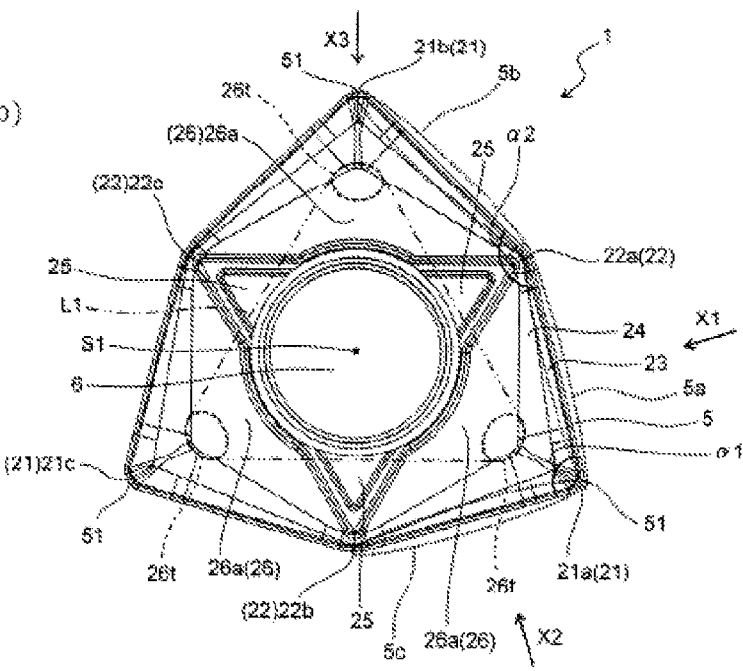
FIG. 1(b) is a plan view (top view) thereof.
Figure 2A:
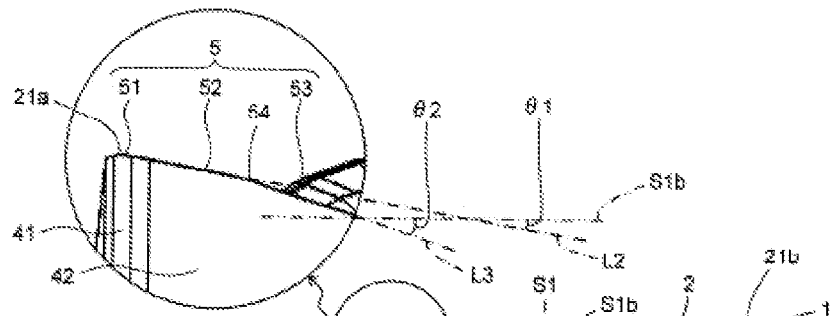
FIG. 2(a) is a side view of the cutting insert shown in FIG. 1, specifically a fragmentary view taken in the direction of an arrow X1.
Figure 2B:
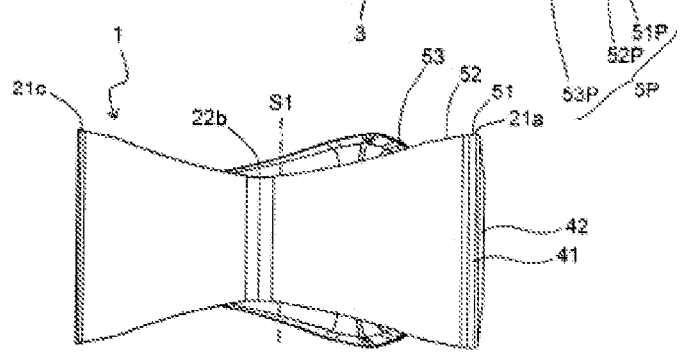
FIG. 2(b) is a fragmentary view taken in the direction of an arrow X2.
Figure 2C:
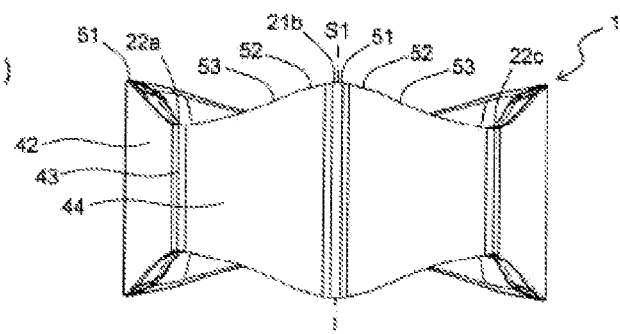
FIG. 2(c) is a fragmentary view taken in the direction of an arrow X3.

As shown in FIGS. 1 and 2, the insert 1 of the present embodiment generally includes an upper surface 2 having a polygonal shape (hexagonal shape), a lower surface 3 being identical in shape to the upper surface 2, a side surface 4 connected to each of the upper surface 2 and the lower surface 3, a through hole 6 (fitting hole) extending between the upper surface 2 and the lower surface 3, an upper cutting edge 5 located at an intersection of the upper surface 2 and the side surface 4, and a lower cutting edge 5P located at an intersection of the lower surface 3 and the side surface 4. For example, the insert 1 may be configured so that the upper surface 2 measures 5-100 mm on each side and the upper and lower surfaces 2 and 3 respectively measure 3-100 mm thick. As shown in FIG. 1, the through hole 6 of the present embodiment is located at a middle part on each of the upper surface 2 and the lower surface 3.

The insert 1 of the present embodiment has the hexagonal shape (approximately hexagonal shape) as shown in FIG. 1(b) in the top view as described above. The phrase "top view" denotes a state that the insert 1 is viewed from the upper surface 2.

The insert 1 alternately has three major corners 21 (first to third major corners 21a to 21c) as two or more major corners each having a first interior angle α1, and three minor corners 22 (first to third minor corners 22a to 22c) as two or more minor corners each having a second interior angle α2 larger than the first interior angle α1. The major corners 21 also respectively include a later-described first corner, and the minor corners also respectively include a later-described second corner. The first corner of the present embodiment corresponds to the first major corner 21a and hence is described by using the same reference numeral as the first major corner 21a. Similarly, the second corner of the present embodiment corresponds to the first minor corner 22a and hence is described by using the same reference numeral as the first minor corner 22a.

The concept of the phrase "hexagonal shape" includes somewhat deformation in such a range in which a certain function can be exhibited, without being limited to the case of a strict hexagonal shape (regular hexagon). That is, the hexagonal shape of the present embodiment includes the cases where, for example, individual sides or vertexes thereof have a slightly curved line shape.

Further in the insert 1 of the present embodiment, the upper cutting edge 5 is located over the entire periphery of the upper surface 2, and includes first and second major cutting parts 5a and 5c (cutting sections) of identical shape which are extended from the single major corner 21 to the two adjacent minor corners 22 and 22 on both sides of the single major corner 21. Therefore, a cutting process can be performed at each of the three major corners 21 by causing a bidirectional rotation for a right-handed operation and a left-handed operation. That is, the insert 1 of the present embodiment is usable as an insert substantially having the six major corners by using each of the three major corners 21 for the right-handed operation and the left-handed operation.

The first interior angle α1 is preferably an approximately right angle. The phrase "approximately right angle" denotes a substantially right angle. Specifically, the approximately right angle in the present embodiment includes ones in the range of 90°±3°. Particularly, the first interior angle α1 is preferably larger than 90°. The second interior angle α2 is preferably set in the range of 140° to 150°. The lengths of the individual sides are preferably identical from the viewpoint of ensuring a large length of the cutting edges contributing to cutting while using all of the individual sides for the cutting process.

The insert 1 of the present embodiment is the so-called negative type insert allowing both the upper surface 2 and the lower surface 3 to be respectively used as the surface that exhibits a rake function as shown in FIGS. 1(a) and 2(a). Accordingly, when the cutting process is performed with the lower cutting edge 5P, a part of the lower surface 3 is usable as a rake surface, and a part of the upper surface 2, namely, a later-described upper mount part 26 included in the upper surface 2 is usable as a seating surface (mount part). That is, according to the insert 1 of the present embodiment, the upper surface 2 and the lower surface 3 have the same shape, thus making both the upper and lower surfaces usable for the cutting process. When the cutting process is performed with the upper cutting edge 5, a part of the lower surface 3, namely, a flat surface shaped lower mount part 36 included in the lower surface 3 functions as a seating surface (mount part) for ensuring attachment to a holder 11 (refer to FIG. 8).

Unless otherwise stated, the description of the upper surface 2 is applicable to the lower surface 3.

Next, the individual components of the insert 1 of the present embodiment are described in details.

The upper surface 2 is the surface having a so-called rake function for discharging chips, and includes sequentially, as going inward from the upper cutting edge 5, a rake surface 23 inclined toward the lower surface 3, a connection surface 24 inclined toward the lower surface 3, and the flat surface shaped upper mount part 26 substantially perpendicular to a central axis S1. The term "inward" denotes being located inside the insert 1 with respect to the upper cutting edge 5 and located closer to the through hole 6 (the central axis S1). The phrase "central axis S1" is the axis that extends between the upper surface 2 and the lower surface 3, and serves as a rotation axis when the insert 1 is rotated in a top view.

In the present embodiment, the rake surface 23, the connection surface 24 and the upper mount part 26 are continuous with each other. This ensures a larger area of the upper mount part 26, thereby improving attachment stability to the holder 11. That is, for example, a distance from a top portion 26t of the upper mount part 26 to a corner cutting edge 51, namely, an amount of overhang can be reduced, thereby reducing a bending moment exerted on the insert 1. Consequently it is capable of reducing the probability that the insert 1 is damaged during the cutting process.

The rake surface 23 is the region mainly exhibiting the foregoing rake function and is continuous with the upper cutting edge 5. The rake surface 23 is inclined downward from the upper cutting edge 5 toward the central axis S1, namely, at a rake angle β on the basis of a vertical plane S1b perpendicular to the central axis S1 so as to approach the lower surface 3 (refer to FIG. 6). In the present embodiment, the rake angle β is located over the entire periphery of the insert 1. The rake angle β is preferably set in the range of 10° to 30°.

Figure 3:
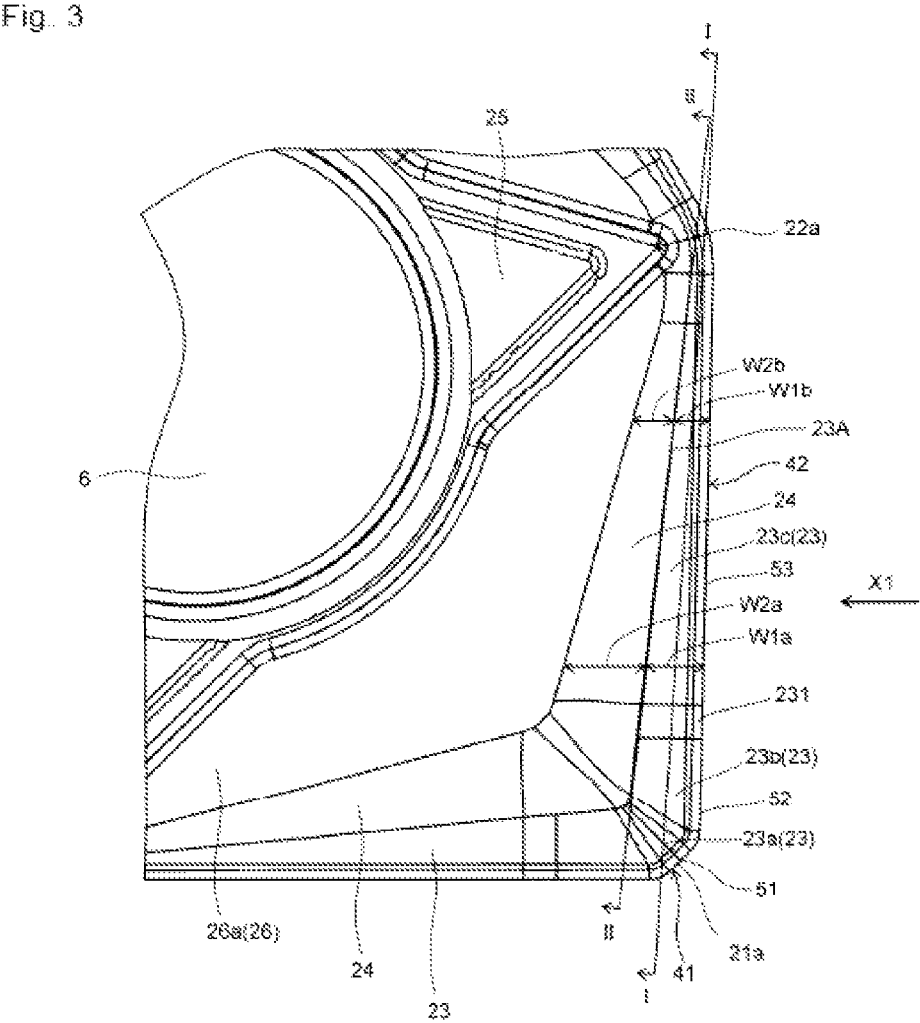
FIG. 3 is a partially enlarged plan view (top view) of the cutting insert shown in FIG. 1.
Figure 6A:
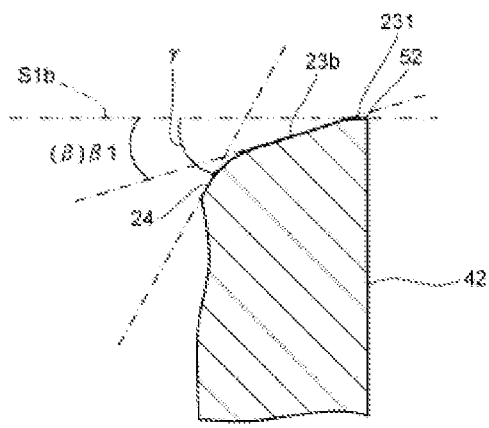
FIG. 6(a) is a sectional view showing a state that the cutting insert of FIG. 5 is cut away, specifically a sectional view taken along line a-a therein.
Figure 6B:
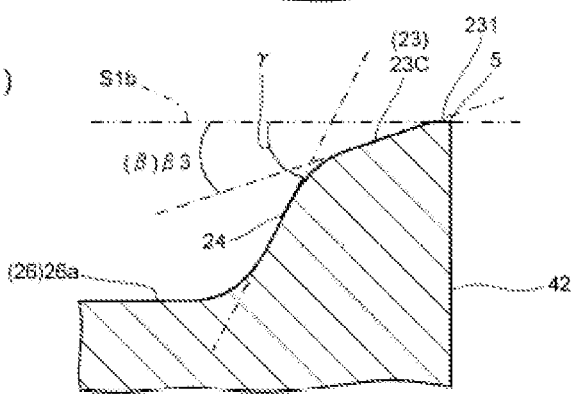
FIG. 6(b) is a sectional view taken along line b-b therein.
Figure 6C:
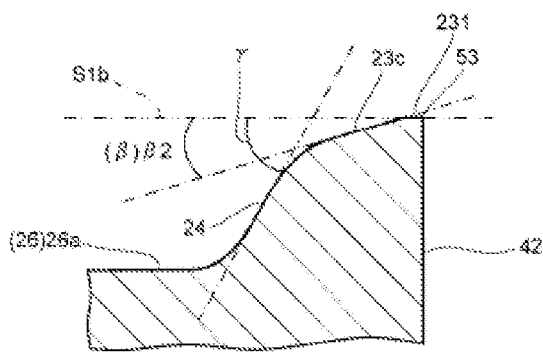
FIG. 6(c) is a sectional view taken along line c-c therein.

To be specific, the rake surface 23 includes a corner rake surface 23a, a minor rake surface 23b and a major rake surface 23c as shown in FIG. 3. As shown in FIG. 6, the minor rake surface 23b is continuous with a later-described minor cutting edge 52 and is inclined downward as going inward, namely, at a first rake angle β1 on the basis of the vertical plane S1b so as to approach the lower surface 3. The major rake surface 23c is continuous with a later-described major cutting edge 53 and is inclined downward as going inward, namely, at a second rake angle β2 on the basis of the vertical plane S1b so as to approach the lower surface 3. In FIG. 3, the region between the minor rake surface 23b and the major rake surface 23c is a connection surface having a gentle curved surface shape.

Figure 4A:
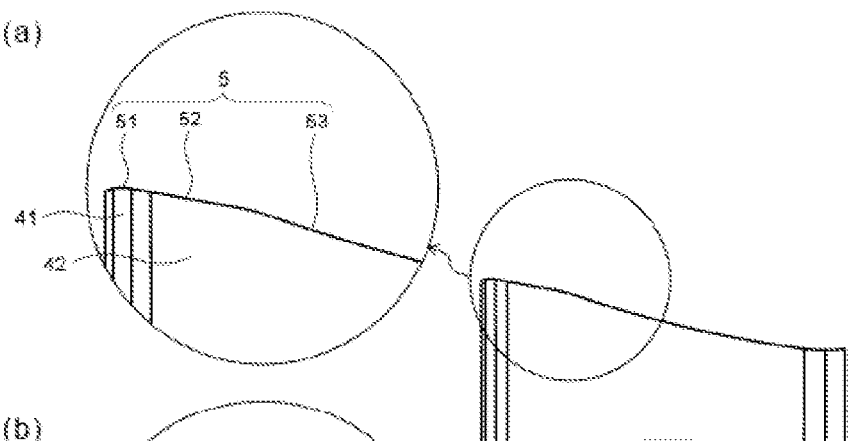
FIG. 4(a) is a view of the cutting insert in FIG. 3, taken from a first side surface, specifically a fragmentary side view taken in the direction of an arrow X1.
Figure 4B:
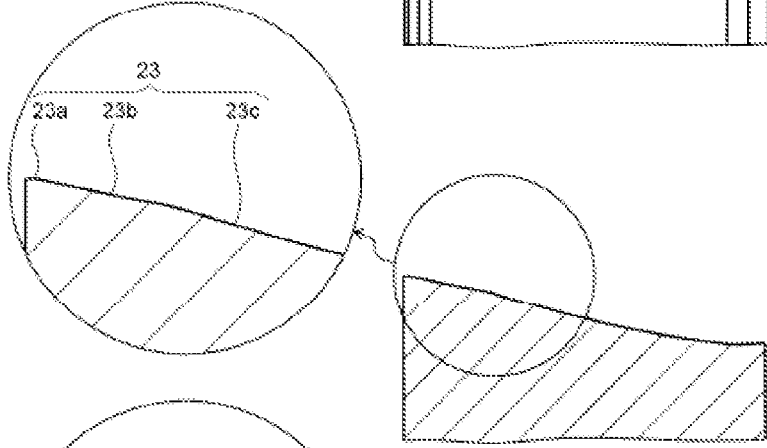
FIG. 4(b) is a sectional view taken along line I-I therein.

As shown in FIGS. 3 and 4, a cross section of the rake surface 23 obtained by cutting an inwardly located end portion 23A along the direction of the central axis S1 has a straight line shape or concave shape in a region 23B crossing over at least the minor rake surface 23b and the major rake surface 23c. The cross section of the rake surface 23 of the present embodiment has the straight line shape in the region 23B.

The insert 1 of the present embodiment has the foregoing configuration, and hence convex-shaped chips generated by the region corresponding to the minor cutting edge 52 and the major cutting edge 53 of the upper cutting edge 5 as described later can be deformed into the straight line shape or concave shape while the convex-shaped chips pass through the rake surface 23. Therefore, the excellent chip discharge performance is exhibitable by stably curling the chips in the following chip discharge process.

Figure 4C:
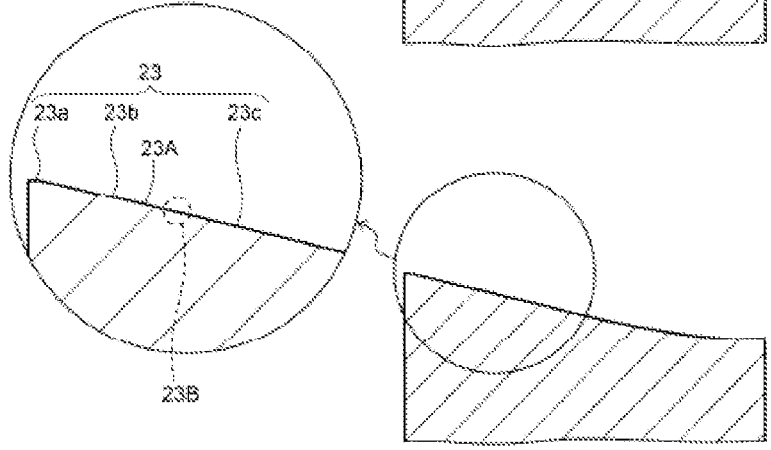
FIG. 4(c) is a sectional view taken along line II-II therein.

As shown in FIG. 4(c), the foregoing cross section preferably has the straight line shape or concave shape in an approximately entire region of the minor rake surface 23b and the major rake surface 23c. According to this configuration, the excellent chip discharge performance is exhibitable under condition of a wide cutting depth.

The inwardly located end portion 23A of the rake surface 23 preferably has a straight line shape in a top view as shown in FIG. 3. This contributes to enhancement of chip curling stability.

A width W1 of the rake surface 23 is preferably decreased from the first corner 21a to the second corner 22a in a top view as shown in FIG. 3. That is, the rake surface 23 of the present embodiment has a relationship of W1a>W1b. According to this configuration, the excellent chip discharge performance is exhibitable under the condition of the wide cutting depth.

In the present embodiment, as shown in FIG. 3, the rake surface 23 further includes a land surface 231 located at an end portion thereof and located closer to the upper cutting edge 5. The land surface 231 is substantially parallel to the vertical plane S1b. This configuration contributes to improved strength of the upper cutting edge 5, thus allowing the insert 1 to be suitably used under machining conditions of so-called heavy-duty cutting.

The upper mount part 26 is the flat surface shaped region located more inward than the rake surface 23 on the upper surface 2 as shown in FIG. 1 and the like. The upper mount part 26 generally has a polygonal shape, particularly a hexagonal shape in a top view in the insert 1 of the present embodiment. The concept of the phrase "polygonal shape" includes, for example, the configuration that a connection part between the sides is somewhat curved in such a range in which a predetermined operation advantage can be obtained, without being limited to the case of strictly having vertexes.

The outer periphery of the through hole 6 is located inside a region surrounded by a straight line L1 connecting top portions 26t corresponding to the three major corners 21 of the upper mount part 26 in a top view as shown in FIG. 1(b). The phrase "top portions" denotes the regions corresponding to the vertexes of the polygonal shape, however, it may indicate regions in the vicinity of the vertexes which are respectively oval-shaped zones shown by dotted lines as shown in FIG. 1(b). This is also true for the following.

The upper mount part 26 is preferably provided with three separate parts 26a spaced apart from each other as shown in FIG. 1(b). Accordingly, when the insert 1 is attached to the holder 11, the three separate parts 26a of the insert 1 can individually be brought into contact with their corresponding contact surfaces of the holder 11, thereby improving the attachment stability to the holder 11. For example, even when the shape of the upper mount part 26 is subjected to deformation, such as bending, in the firing process in the manufacturing process of the insert 1, the three separate parts 26a, which are independent of one another, can be relatively strongly brought into contact with the contact surfaces of the holder 11 without requiring any additional process, such as grinding process.

Each of the three separate parts 26a has a triangular shape in a top view. Particularly, one top portion of the triangular shape of each of the separate parts 26a is preferably most adjacent to the major corner 21. This configuration further improves the attachment stability to the holder 11. When the cutting process is performed with the upper cutting edge 5, the lower mount part 36 of the lower surface 3 serves as the surface brought into contact with the holder 11, and vice versa.

In the present embodiment, the upper mount part 26 of the upper surface 2 is located on the most underside, namely, located closest to the lower surface 3 among any regions of the upper cutting edge 5 in a side view as shown in FIG. 2. The phrase "side view" denotes a state that the insert 1 is viewed from the side surface 4. This configuration reduces the probability that the chips generated by the upper cutting edge 5 collide with the upper mount part 26 during the cutting process, thereby reducing damage to the upper mount part 26. Specifically, by setting a large distance between the upper cutting edge 5 and the upper mount part 26, a large space for generating the chips can be ensured and the chip discharge performance can be improved. Additionally, for example, when the shape of the upper mount part 26 is subjected to deformation, such as bending, during a firing process in the manufacturing process of the insert 1, it is difficult to shape the upper mount part 26 by grinding process when the upper mount part 26 is located more closer to the lower surface 3 than the upper cutting edge 5. However, a stable contact with the contact surfaces of the holder 11 can be ensured by sloping the upper mount part 26 without requiring the grinding process.

An end portion of the lower mount part 36 of the lower surface 3, which is located more closer to the central axis S1 than the other end portion located closer to the lower cutting edge 5P, is located closer to the upper surface 2, namely, on the upper side on the basis of the vertical plane S1b. In other words, an outer peripheral region of the lower mount part 36 is located more outward than a middle region thereof on the lower surface 3 in the thickness direction of the insert 1. Accordingly, when the insert 1 is attached to the holder 11 with the upper surface 2 oriented forward in a rotation direction of the holder 11, the end portion of the lower mount part 36 located closer to the lower cutting edge 5P can be relatively strongly brought into contact with the corresponding contact surface of the holder 11, and the end portion thereof located closer to the central axis S1 can be relatively weakly brought into contact with the corresponding contact surface of the holder 11. Consequently, the attachment to the holder 11 via the end portion located closer to the lower cutting edge 5P can be assisted by the end portion located closer to the central axis S1, thereby improving the attachment stability to the holder 11. An inclination angle from the middle region to the outer peripheral region of the lower mount part 36 is preferably set in the range of 80° to 90° on the basis of the central axis S1.

The connection surface 24 is located between the rake surface 23 and the upper mount part 26, and is connected to each of the rake surface 23 and the upper mount part 26 on the upper surface 2 as shown in FIGS. 1 and 3. The connection surface 24 functions as a clearance for chips passing through the rake surface 23, and also contributes to ensuring a large area of the upper mount part 26.

The connection surface 24 is inclined downward as going inward, namely, at a connection angle γ on the basis of the vertical plane S1b so as to approach the lower surface 3 (refer to FIG. 6). The connection angle γ of the connection surface 24 is larger than both the first rake angle β1 of the minor rake surface 23b and the second rake angle β2 of the major rake surface 23c. Thereby, the foregoing function can be exhibited effectively.

A width W2 of the connection surface 24 is preferably decreased from the first corner 21a to the second corner 22a in a top view as shown in FIG. 3. That is, the connection surface 24 of the present embodiment has a relationship of W2a>W2b. According to this configuration, the foregoing excellent chip discharge performance is exhibitable under the condition of the wide cutting depth.

The upper surface 2 may further include a concave part 25 located more closer to the lower surface 3, namely, more downwardly than the upper amount part 26 on the circumference of the through hole 6 as shown in FIG. 1. As described above, the three separate parts 26a are spaced apart from one another with the through hole 6 and the concave part 25 interposed therebetween. This configuration allows each of the three separate parts 26a to be more surely brought into contact with the corresponding contact surfaces of the holder 11, thereby further improving the attachment stability to the holder 11.

The upper cutting edge 5 includes the corner cutting edge 51, the minor cutting edge 52 and the major cutting edge 53 as shown in FIGS. 1 and 2. Specifically, the upper cutting edge 5 of the present embodiment includes the corner cutting edge 51, the minor cutting edge 52 inclined downward as separating from the corner cutting edge 5, namely, at a first inclination angle θ1 on the basis of the vertical plane S1b so as to approach the lower surface 3, and the major cutting edge 53 inclined downward as separating from the minor cutting edge 52, namely, at a second inclination angle θ2 on the basis of the vertical plane S1b so as to become more closer to the lower surface 3 than the minor cutting edge 52. The corner cutting edge 51, the minor cutting edge 52 and the major cutting edge 53 are located sequentially, for example, from the first major corner (first corner) 21a of the three major corners 21 to the first minor corner (second corner) 22a of the three minor corners 22 which is adjacent to the first major corner 21a. Consequently, the chips generated by the minor cutting edge 52 and the major cutting edge 53 of the upper cutting edge 5 are formed into the convex shape as described above.

The insert 1 is capable of having both low cutting resistance and excellent fracture resistance by combining the inclination configuration of the individual cutting edge regions of the upper cutting edge 5 with the major corner 21 having the first interior angle α1 and the minor corner 22 having the second interior angle α2. The upper cutting edge 5 also includes the corner cutting edge 51, the minor cutting edge 52 and the major cutting edge 53, which are disposed sequentially from the first major corner (first corner) 21a to another adjacent second minor corner 22b of the three minor corners 22. That is, the insert 1 of the present embodiment is configured to be usable for the right-handed and left-handed operations as described above.

The corner cutting edge 51 is located at an intersection of a later-described major corner side surface 41 of the side surface 4 and the upper surface 2 as shown in FIG. 2, and functions to suppress fracture of the upper cutting edge 5 due to cutting force applied thereto during the cutting process. The corner cutting edge 51 is parallel to the vertical plane S1b in the present embodiment.

The corner cutting edge 51 preferably has a straight line shape in a top view in the present embodiment. In comparison with the case of a rounded corner, this configuration increases the width of the front end of the cutting edge in the top view, thereby ensuring high cutting edge strength. This permits reduction of the thickness of chips generated by the major corner 21, thus making it possible to effectively suppress fracture, so-called edge chipping, of edge portions of a workpiece even during machining of cast iron that is a relatively brittle workpiece. The corner cutting edge 51 is preferably inclined at approximately 45° on the basis of a part of the upper cutting edge 5 adjacent thereto (for example, the minor cutting edge 52). This allows the insert 1 to be usable for both right-handed and left-handed operations.

The minor cutting edge 52 is located closer to the corner cutting edge 51 in the intersection of a later-described first side surface 42 of the side surface 4 and the upper surface 2. As shown in FIG. 1(b), the minor cutting edge 52 functions as first and second major cutting edge sections 5a and 5c together with the major cutting edge 53. The minor cutting edge 52 is also the cutting edge, so-called flat drag, functioning mainly to improve the accuracy of a later-described finished surface 102 of a workpiece 100. In the present embodiment, the minor cutting edge 52 has a straight line shape both in a top view and a side view as shown in FIGS. 2 and 3.

As shown in FIG. 2(a), the minor cutting edge 52 is preferably inclined downward as separating from the corner cutting edge 51, namely, at a first inclination angle θ1 on the basis of a vertical plane S1b so as to approach the lower surface 3. This configuration reduces the cutting resistance of the minor cutting edge 52 during the cutting process. Alternatively, the first inclination angle θ1 of the minor cutting edge 52 may be oriented upward, namely, in a direction to separate from the lower surface 3, on the basis of the vertical plane S1b.

The first inclination angle θ1 of the minor cutting edge 52 is preferably set in the range of 3° to 15° toward the lower surface 3. In the present embodiment, the phrase "first inclination angle θ1" denotes an angle formed by the vertical plane S1b and a virtual extension line L2 of the minor cutting edge 52. The phrase "virtual extension line L2" denotes a straight line obtained by extending a tangential line at a start point of the minor cutting edge 52, namely, an end portion of the minor cutting edge 52 located closer to the corner cutting edge 51.

The major cutting edge 53 is located more closer to the first minor corner 22a than the minor cutting edge 52 in the intersection of the first side surface 42 and the upper surface 2 as shown in FIG. 2. The major cutting edge 53 functions mainly to generate chips during the cutting process.

The second inclination angle θ2 of the major cutting edge 53 is preferably set in the range of 7° to 19° toward the lower surface 3. In the present embodiment, the phrase "second inclination angle θ2" denotes an angle formed by the vertical plane S1b and a virtual extension line L3 of the major cutting edge 53. The phrase "virtual extension line L3" denotes a straight line obtained by extending a tangential line at a start point of the major cutting edge 53, namely, an end portion of the major cutting edge 53 located closer to the minor cutting edge 52.

In the present embodiment, the major cutting edge 53 has a concave shape recessed toward the lower surface 3 in a side view. That is, the major cutting edge 53 is curved toward the lower surface 3 in the side view as shown in FIGS. 2(a) and 4(a).

The first inclination angle θ1 of the minor cutting edge 52 is preferably smaller than the second inclination angle θ2 of the major cutting edge 53. This configuration ensures both high cutting strength on the minor cutting edge 52 and low cutting resistance on the major cutting edge 53.

The connection part 54 of the major cutting edge 53 and the minor cutting edge 52 is preferably set to have a convex shape in a side view, namely, so as to be curved in the range of R1.0 to R10.0 in a direction to separate from the lower surface 3 (i.e. upwardly).

Although the thickness of the insert 1 is decreased from the major corner (first corner) 21a to the first minor corner (second corner) 22a as shown in FIG. 2(a), the second interior angle α2 of the second corner 22a is larger than the first interior angle α1 of the first corner 21a as shown in FIG. 1(b), thereby ensuring high cutting edge strength in each of cutting edge regions of the upper cutting edge 5.

Similarly to the upper cutting edge 5, the lower cutting edge 5P also includes a corner cutting edge 51P, a minor cutting edge 52P and a major cutting edge 53P as shown in FIG. 2(a). The configurations of the corner cutting edge 51P, the minor cutting edge 52P and the major cutting edge 53P are respectively identical to those of the corner cutting edge 51, the minor cutting edge 52 and the major cutting edge 53.

The side surface 4 is the surface functioning as a so-called clearance part for reducing contact with the workpiece 100. In the present embodiment, as shown in FIG. 2, the side surface 4 is perpendicular to the upper surface 2 and the lower surface 3, namely, perpendicular on the basis of the central axis S1. This configuration ensures the thickness of the insert 1 in a direction perpendicular to the central axis S1, and hence the insert 1 has excellent fracture resistance in comparison with an insert whose side surface 4 has a clearance angle between the upper surface 2 or the lower surface 3.

As a specific configuration, the side surface 4 connected to the hexagonal shaped upper surface 2 has, sequentially from the first major corner 21a to the second major corner 21b, a major corner side surface 41, a first side surface 42, a minor corner side surface 43 and a second side surface 44 as shown in FIG. 2(a). Both the first side surface 42 and the second side surface 44 are flat surfaces. The minor corner side surface 43 is a curved surface, and the major corner side surface 41 is a flat surface. This configuration corresponds to the fact that the corner cutting edge 51 located at the intersection of the major corner side surface 41 and the upper surface 2 has the straight line shape in the top view.

The through hole 6 extends between the upper surface 2 and the lower surface 3 as shown in FIG. 1 and the like, and functions to fix the insert 1 to the later-described holder 11. That is, a fitting screw 12 (fixing member) is inserted into the through hole 6 and is further screwed to the holder 11. Thus, by fixing the insert 1 to the holder 11 in this manner, a cutting tool 10 is obtained. The central axis of the through hole 6 exists at the same position as the central axis S1.

Second Embodiment

An insert according to a second embodiment of the present invention is described in details below with reference to FIGS. 5 and 6. The basis configuration of the insert of the present embodiment is identical to that of the insert of the foregoing first embodiment. Therefore, the same components as those in the insert of the first embodiment are identified by the same reference numerals in these drawings and the description thereof is omitted. The following description is focused on portions that differ in configuration from the foregoing insert.

Figure 5:
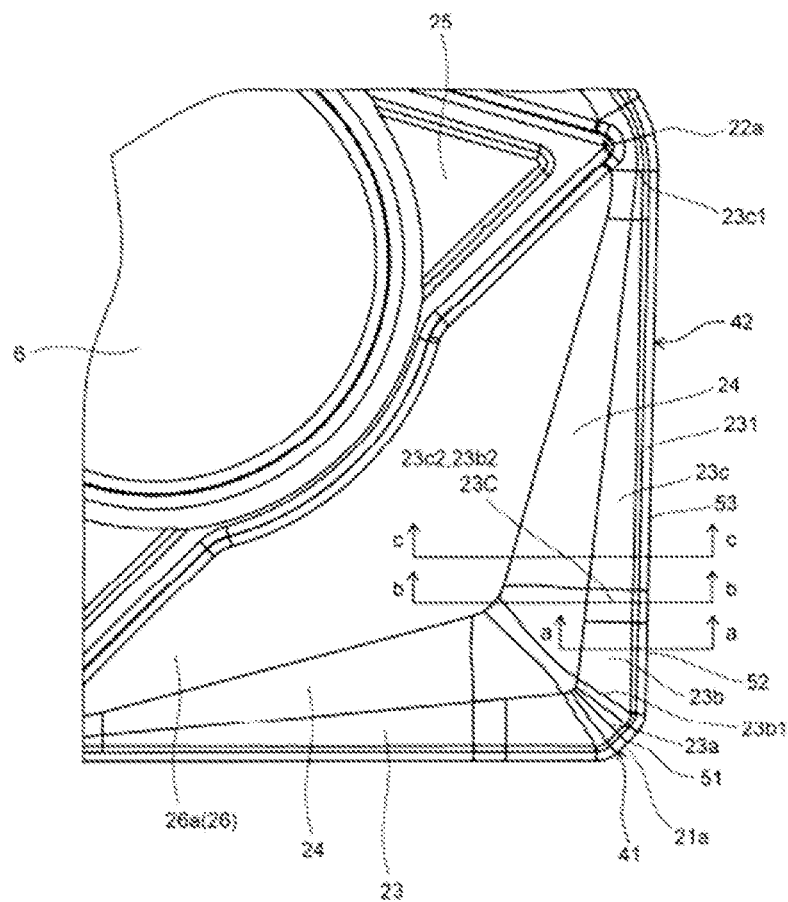
FIG. 5 is a partially enlarged plan view (top view) of a cutting insert according to a second embodiment of the present invention.

Similarly to the first embodiment, a rake surface 23 in the insert 1 of the present embodiment includes a minor rake surface 23b that is continuous with a minor cutting edge 52 and is inclined as going inward, namely, at a first rake angle β1 on the basis of a vertical plane S1b so as to approach a lower surface 3, and a major rake surface 23c that is continuous with a major cutting edge 53 and is inclined as going inward, namely, at a second rake angle β2 on the basis of the vertical plane S1b so as to approach the lower surface 3 as shown in FIGS. 5 and 6.

Further in the insert 1 of the present embodiment, the first rake angle β1 of the minor rake surface 23b is large at an end portion 23b2 located more closer to a second corner 22a than an end portion 23b1 located closer to a first corner 21a, and the second rake angle β2 of the major rake surface 23c is large at an end portion 23c2 located more closer to the first corner 21a than an end portion 23c1 located closer to the second corner 22a. That is, when a rake angle at a connection part 23C of the minor rake surface 23b and the major rake surface 23c is denoted by β3, the first to third rake angles β1 to β3 have relationships of β3>β1 and β3>β2.

According to the above configuration, the insert 1 of the present embodiment is also capable of deforming convex-shaped chips generated by the region corresponding to the minor cutting edge 52 and the major cutting edge 53 of the upper cutting edge 5 into a straight line shape or concave shape while the convex-shaped chips pass through the rake surface 23. Therefore, excellent chip discharge performance is exhibitable by stably curling the chips in the following chip discharge process. In FIG. 5, the line a-a is located between the end portion 213b1 and the end portion 23b2, and the line c-c is located between the end portion 23c1 and the end portion 23c2.

Preferably, the first rake angle β1 of the minor rake surface 23b is increased from the first corner 21a to the second corner 22a, and the second rake angle γ2 of the major rake surface 23c is increased from the second corner 22a to the first corner 21a. Thus, the first rake angle β1 and the second rake angle β2 are increased toward the connection part 23C of the minor rake surface 23b and the major rake surface 23c, thereby achieving smoother chip discharge.

<Cutting Tool>

Figure 7A:
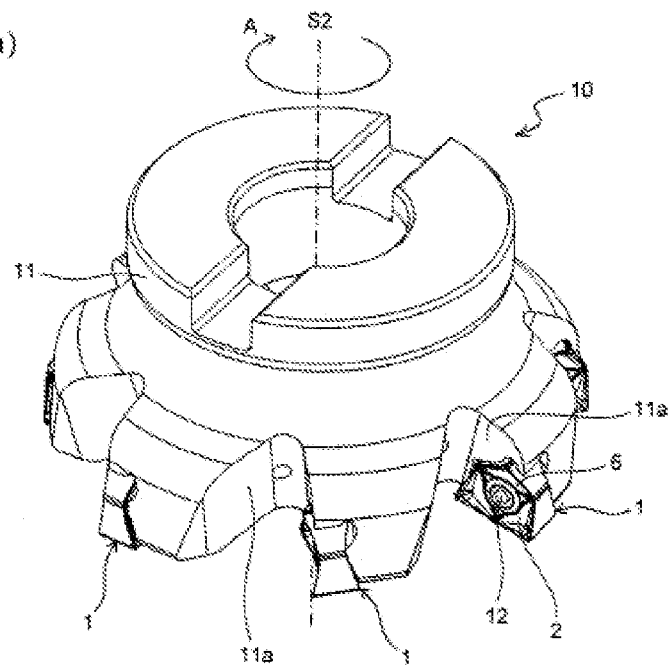
FIG. 7(a) is a perspective view of a cutting tool according to an embodiment of the present invention.

A cutting tool according to an embodiment of the present invention is described in details below with reference to FIGS. 7 and 8.

Figure 7B:
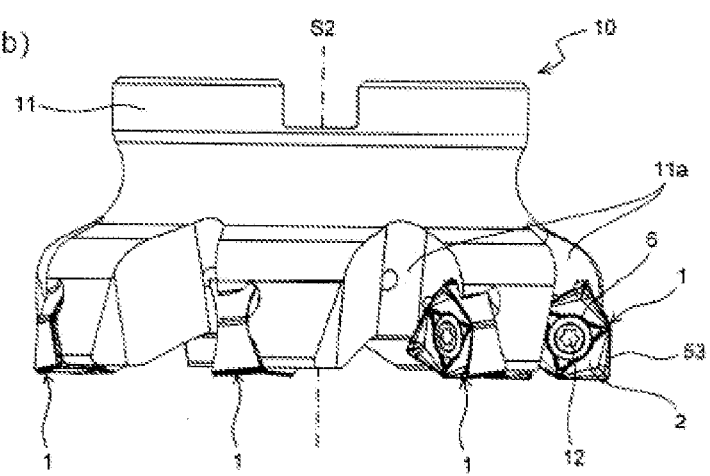
FIG. 7(b) is a side view thereof.

As shown in FIG. 7, the cutting tool 10 of the present embodiment includes a plurality of inserts 1 as described above, and the holder 11 configured to attach the plurality of inserts 1 thereto by using a fixing member.

The holder 11 has a plurality of insert pockets 11a at outer peripheral front ends thereof. The inserts 1 are respectively attached to outer peripheral positions in the insert pockets 11a. Specifically, when the cutting tool 10 is rotated in an arrowed direction A in FIG. 7(a), the inserts 1 are attached so that the upper surface (rake surface) 2 is oriented forward in the arrowed direction A as the rotation direction, and the major cutting edge 53 is located at the outermost periphery of the holder 11. As an attachment method, the plurality of inserts 1 are respectively fixed to the holder 11 by inserting the fitting screw 12 (fixing member) into each of the through holes 6 of the plurality of inserts 1, and by screwing the fitting screw 12 to the holder 11.

Figure 8A:
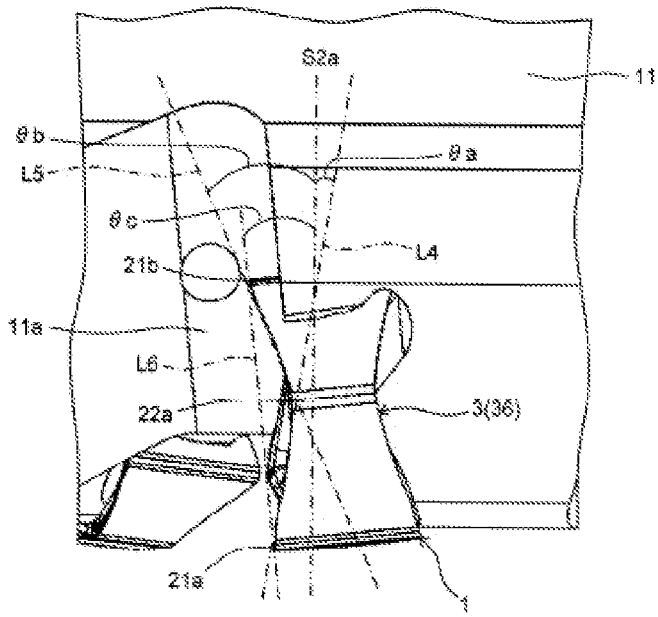
FIG. 8(a) is an enlarged side view of an attached state of the cutting insert in the cutting tool in FIG. 7, specifically a view of the cutting insert taken from the side surface thereof.

In the present embodiment, as shown in FIG. 8(a), each of the inserts 1 is attached to the holder 11 in a state that the first major cutting section 5a of the upper cutting edge 5 extending from the first major corner (first corner) 21a to the first minor corner (second corner) 22a adjacent thereto has a positive axial rake angle θa, and the non-cutting section 5b of the upper cutting edge 5 extending from the first minor corner 22a to the second major corner 21b adjacent thereto has a negative axial rake angle θb on the basis of the parallel plane S2a parallel to a rotation axis S2 of the holder 11.

The first major cutting section 5a includes the minor cutting edge 52 and the major cutting edge 53, and has a positive axial rake angle θa both in the minor cutting edge 52 and the major cutting edge 53 in the present embodiment. For example, the axial rake angle of the minor cutting edge 52 is preferably set in the range of 0° to 10°, and the axial rake angle of the major cutting edge 53 is preferably set in the range of 5° to 20°. With respect to a curved line shaped cutting edge, such as the major cutting edge 53, the axial rake angle θa may be measured using a straight line L4 obtained by extending a tangential line at a start point of the major cutting edge 53, namely, an end portion thereof located closer to the minor cutting edge 52. The axial rake angle θb may be measured using a straight line L5 obtained by extending a tangential line at a start point of the non-cutting section 5b, namely, an end portion thereof located closer to the first minor corner 22a.

As shown in FIG. 8(a), each of the inserts 1 is also attached to the holder 11 in a state that a straight line L6 connecting the first major corner 21a and the second major corner 21b of the upper cutting edge 5 has a negative axial rake angle θc. In other words, the entirety including the first major cutting section 5a and the non-cutting section 5b has a negative axial rake angle.

The cutting tool 10 is obtained by attaching the inserts 1 to the holder 11 in the above manner. The workpiece 100 can be subjected to various kinds of cutting processes, such as the face milling process and a plunging milling process, as described later by rotating the cutting tool 10 in the arrowed direction A.

Figure 8B:
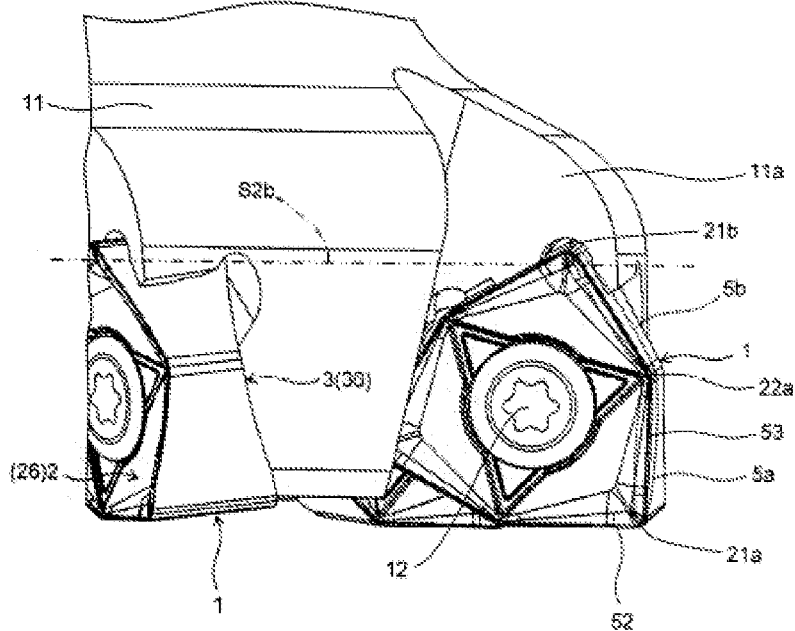
FIG. 8(b) is a view of the cutting insert taken from the upper surface thereof.

For example, when the face milling process is performed as shown in FIG. 8(b), a cut surface 101 can be formed by cutting the workpiece 100 with the first major cutting section 5a of the insert 1, and a finished surface 102 can be formed by cutting the workpiece 100 with the minor cutting edge 52. Hereat, a setting is made so that the minor cutting edge 52 has a substantially parallel relationship with the vertical plane S2b perpendicular to the rotation axis S2 of the holder 11.

<Method of Manufacturing Machined Product>

Next, methods of manufacturing a machined product according to a first or second embodiment of the present invention are described in details below with reference to FIGS. 9 and 10.

The method of manufacturing a machined product according to the first or second embodiment includes rotating the cutting tool 10 of the foregoing embodiment on the basis of the rotation axis S2 of the holder 11; bringing the upper cutting edge 5 of the cutting tool 10 being rotated into contact with a surface of the workpiece 100; and separating the cutting tool 10 from the workpiece 100. The first and second embodiments are respectively described in details below.

First Embodiment

The method of manufacturing a machined product according to the first embodiment is described in details with reference to FIG. 9 by taking the example of so-called face milling process.

The method of manufacturing a machined product according to the present embodiment includes the following steps (i) to (iii). In the following, the order of these steps may be changed suitably unless otherwise stated.

Figure 9A:
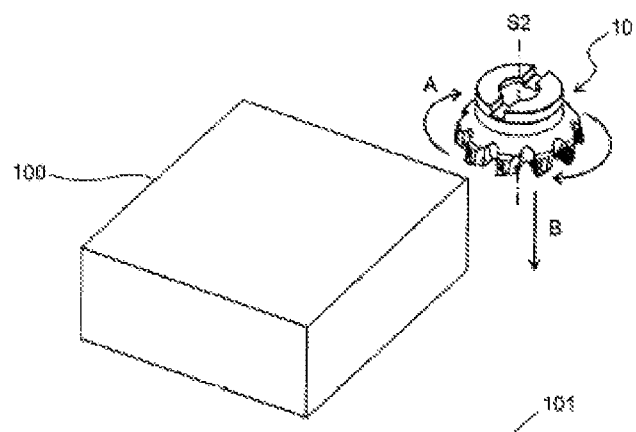
FIGS. 9(a) to 9(c) are process drawings showing a method of manufacturing a machined product according to a first embodiment of the present invention.

The step (i) includes: rotating the cutting tool 10 around the rotation axis S2 of the holder 11 (cutting tool 10) in the arrowed direction A as shown in FIG. 9(a); and bringing the cutting tool 10 near the workpiece 100 by moving the cutting tool 10 in an arrowed direction B.

Figure 9B:
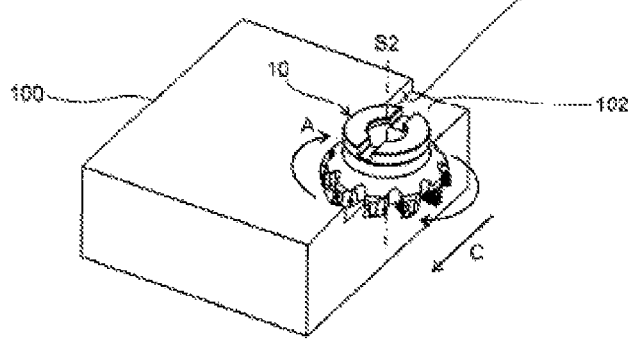

The step (ii) is to bring the upper cutting edge 5 of the cutting tool 10 being rotated into contact with the surface of the workpiece 100 as shown in FIG. 9(b). In the present embodiment, the step (ii) includes the following three substeps.

The first substep is to allow the cutting tool 10 being rotated to move in an arrowed direction C that is the direction perpendicular to the rotation axis S2. Thereby, the workpiece 100 can be subjected to the face milling process.

The second substep is to bring the first major cutting section 5a of the upper cutting edge 5 extending from the first major corner 21a to the first minor corner 22a adjacent thereto in the cutting tool 10 being rotated, into contact with the surface of the workpiece 100. Consequently, a target cutting surface of the workpiece 100 cut by being brought into contact with the first major cutting section 5a becomes a cut surface 101 as shown in FIG. 9(b).

The third substep is to bring the minor cutting edge 52 of the upper cutting edge 5 located between the first major corner 21a and the second minor corner 22b in the cutting tool 10 being rotated, into contact with the target cutting surface of the workpiece 100 formed by being brought into contact with the first major cutting section 5a. Thereby, the portion of the target cutting surface of the workpiece 100 cut by the first major cutting section 5a in the foregoing second substep, which remains without being directly cut by the first major cutting section 5a, can be smoothed by the minor cutting edge 52, resulting in the finished surface 102 as shown in FIG. 9(b).

Figure 9C:
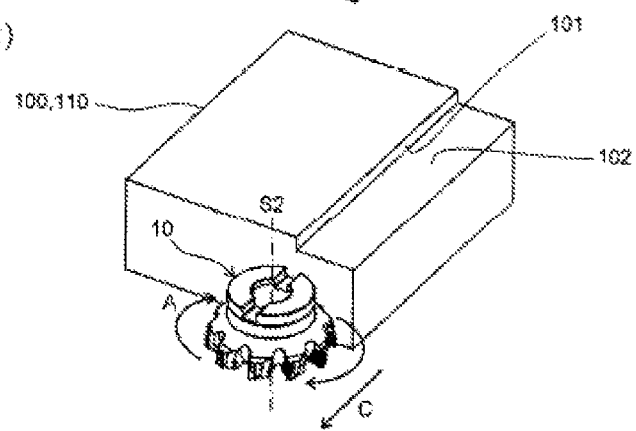

The step (iii) is to separate the cutting tool 10 from the workpiece 100 by moving the cutting tool 10 just as it is in an arrowed direction C as shown in FIG. 9(c).

A machined product 110, which is obtained by cutting the workpiece 100 into the desired shape as shown in FIG. 9(c), is manufactured by being subjected to the foregoing individual steps.

When the cutting process is continuously performed, for example, it is required to repeat the step of bringing the upper cutting edge 5 of the cutting tool 10 into contact with different portions of the workpiece 100, while keeping the rotation of the cutting tool 10.

When the major corner 21 of the upper cutting edge 5 used for the cutting process is worn, the major corner 21 of the upper cutting edge 5 not yet being used can be used by rotating the insert 1 by 120° with respect to the central axis S1. Alternatively, in the present embodiment, the single major corner 21 of the insert 1 is usable for a reverse-handed cutting process by rotating the cutting tool 10 in the opposite direction to the arrowed direction A. Thus, the present embodiment permits use as the insert substantially having the six major corners by using each of the three major corners 21 for the right-handed and left-handed operations. By changing the rotation direction of the cutting tool 10 into the opposite direction to the arrowed direction A, the minor cutting edge 52 in the first major cutting section 5a functions as a cutting edge for forming the finished surface 102. The above description of the upper cutting edge 5 is also true for the lower cutting edge 5P.

The following modifications are applicable to the foregoing steps. For example, in the step (i), the workpiece 100 may be rotated while keeping the cutting tool 10 stationary. The cutting tool 10 and the workpiece 100 need to be closer to each other. For example, conversely to the above-mentioned step, the workpiece 100 may be brought near the cutting tool 10. Similarly, in the step (iii), the workpiece 100 and the cutting tool 10 need to be separated from each other. For example, the workpiece 100 may be separated from the cutting tool 10 being held at a predetermined position. These modifications are also applicable to the following second embodiment.

Second Embodiment

The method of manufacturing a machined product according to the second embodiment is described in details with reference to FIG. 10 by taking the example of so-called plunging milling process.

The method of manufacturing a machined product according to the present embodiment includes the following steps (i) to (iii). In the following, the order of these steps may be changed suitably unless otherwise stated.

Figure 10A:
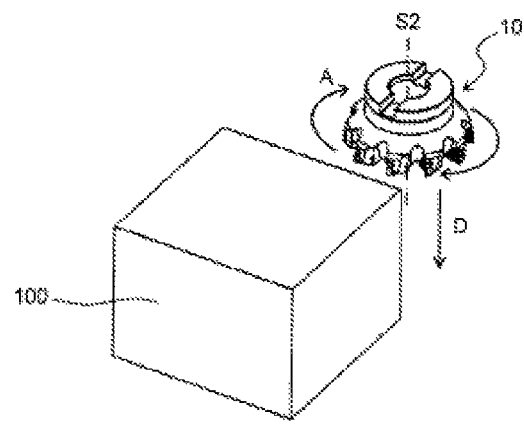
FIGS. 10(a) to 10(c) are process drawings showing a method of manufacturing a machined product according to a second embodiment of the present invention.

The step (i) includes: rotating the cutting tool 10 around the rotation axis S2 of the holder 11 (cutting tool 10) in an arrowed direction A as shown in FIG. 10(a); and bringing the cutting tool 10 near the workpiece 100 by moving the cutting tool 10 in an arrowed direction D.

Figure 10B:
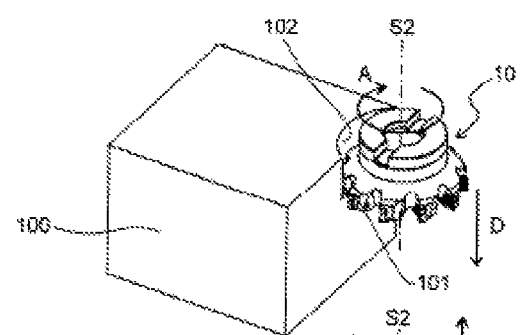

The step (ii) is to bring the upper cutting edge 5 of the cutting tool 10 being rotated into contact with a surface of the workpiece 100 as shown in FIG. 10(b). In the present embodiment, the step (ii) includes the following three substeps.

The first substep is to allow the cutting tool 10 being rotated to move in an arrowed direction D that is the direction parallel to the rotation axis S2. Thereby, the workpiece 100 can be subjected to the plunge milling process.

The second substep is to bring the second major cutting section 5c of the upper cutting edge 5 extending from the first major corner 21a to the second minor corner 22b adjacent thereto in the cutting tool 10 being rotated, into contact with the surface of the workpiece 100. Consequently, a target cutting surface of the workpiece 100 cut by being brought into contact with the second major cutting section 5c becomes a cut surface 101 as shown in FIG. 10(b).

The third substep is to bring the minor cutting edge 52 of the upper cutting edge 5 located between the first major corner 21a and the first minor corner 22a in the cutting tool 10 being rotated, into contact with the target cutting surface of the workpiece 100 formed by being brought into contact with the second major cutting section 5c. Thereby, the portion of the target cutting surface of the workpiece 100 cut by the second major cutting section 5c in the foregoing second substep, which remains without being directly cut by the second major cutting section 5c, can be smoothed by the minor cutting edge 52, resulting in a finished surface 102 as shown in FIG. 10(b).

Figure 10C:
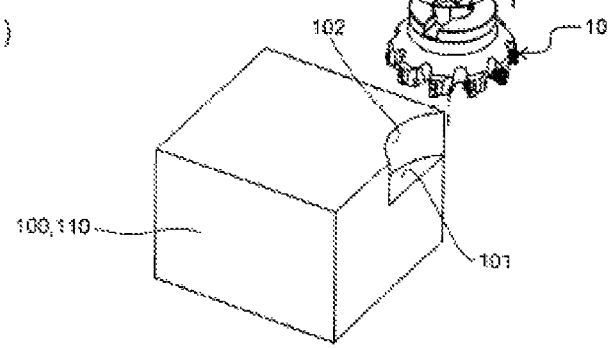

The step (iii) is to separate the cutting tool 10 from the workpiece 100 by moving the cutting tool 10 in an arrowed direction E as shown in FIG. 10(c).

A machined product 110, which is obtained by cutting the workpiece 100 into the desired shape as shown in FIG. 10(c), is manufactured by being subjected to the foregoing individual steps.

When the cutting process is continuously performed, it is required to perform similarly to the foregoing first embodiment. Also, when the cutting edge used for the cutting process is worn, it is required to perform similarly to the foregoing first embodiment.

While the several embodiments of the present invention have been illustrated and described, it is to be understood that the present invention is not limited to the foregoing embodiments but various changes and modifications can be made therein without departing from the spirit or scope of the present invention.

For example, the inserts 1 of the foregoing embodiments have the hexagonal shape (approximately hexagonal shape) in the top view as shown in FIG. 1(b). Alternatively, the present invention is applicable to different polygonal shapes, such as quadrangular shape and pentagonal shape. Even in such cases, the foregoing operation advantages are achievable by having the foregoing configurations.

In the foregoing embodiments, the upper surface 2 and the lower surface 3 of the inserts 1 are identical in shape. Alternatively, the upper surface 2 and the lower surface 3 may have different shapes. For example, a configuration that ensures a large clearance angle of the side surface 4 corresponding to the upper cutting edge 5 may be employed to obtain a so-called one side insert for use in the cutting process with the upper cutting edge 5 of the upper surface 2. This configuration is achievable by, for example, making the area of the lower surface 3 smaller than the area of the upper surface 2.

In the inserts 1 of the foregoing embodiments, the connection surface 24 is disposed between the rake surface 23 and the upper mount part 26 on the upper surface 2. Alternatively, the inserts 1 may be configured to have a protruded surface between the rake surface 23 and the upper mount part 26. The protruded surface is inclined upward from the upper cutting edge 5 to the central axis S1, namely, in a direction to depart from the lower surface 3 on the basis of the vertical surface S1b. According to this configuration, chips can be deformed in a small-diameter curl shape when the chips are discharged, thereby improving the chip discharge performance. The protruded surface is preferably disposed at portions corresponding to the three minor corners 22. In this case, the rake surface 23 is preferably continuous with the upper mount part 26 at portions corresponding to the three major corners 21, and is preferably continuous with the upper mount part 26 with the protruded surface interposed therebetween at portions corresponding to the three minor corners 22. The inclination angle of the protruded surface is preferably set in the range of 40° to 70° in a direction to separate from the lower surface 3 on the basis of the vertical plane S1b.

Figure 11:
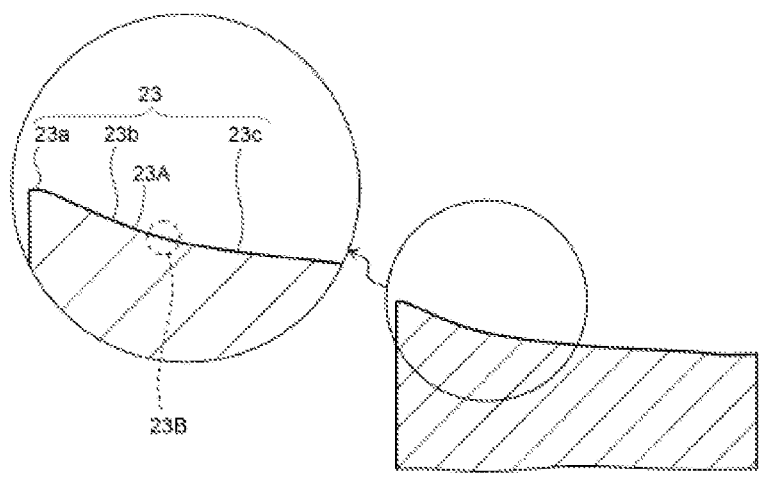
FIG. 11 is a view showing a modification of a rake surface in the cutting insert in FIG. 1, specifically a sectional view corresponding to FIG. 4(c).

In the inserts 1 of the foregoing embodiments, the rake surface 23 is configured to have the straight line shape in the region 23B in the foregoing cross section. Alternatively, the rake surface 23 may be configured to have a concave shape in the region 23B (refer to FIG. 11).

In the inserts 1 of the foregoing embodiments, the rake surface 23 has a relatively smooth surface shape. Alternatively, the portion of the rake surface 23 corresponding to the corner cutting edge 51 may have a convex part (not shown). According to this configuration, chips generated under low cutting depth conditions or low feed conditions can be curled in a relatively small size by the convex part, thus exhibiting excellent chip discharge performance during finish machining process or the like. The entirety of the convex part is preferably disposed so as to fall within the region of the rake surface 23. Further, the highest portion of the convex part is preferably in a lower position than the upper cutting edge 5.

The foregoing embodiments have illustrated and described the inserts 1 configured so that the upper mount part 26 includes the three separate parts 26a. Alternatively, the inserts 1 may employ a structure that connects the three separate parts 26a at their respective portions adjacent to each other as far as a similar effect can be obtained.

Although not being particularly described in the inserts 1 of the foregoing embodiments, the upper surface 2 and the lower surface 3 may have different colors though not particularly mentioned in the inserts 1 of the foregoing embodiments. Specifically, for example, when an insert body is made of silver-colored cemented carbide, either the upper surface 2 or the lower surface 3 is preferably coated with gold-colored titanium nitride (TiN). In the negative-type insert, both the upper surface 2 and the lower surface 3 function as the rake surface, and hence an erroneous attachment of the inserts might occur. By coating either the upper surface 2 or the lower surface 3 with TiN, a surface coated with TiN and an uncoated surface have different colors. It is therefore capable of clearly distinguishing between these two surfaces, thereby reducing misrecognition when attaching the inserts 1. Hereat, a target coating surface of either the upper surface 2 or the lower surface 3 need not be entirely coated. A similar effect is obtainable by coating, for example, a part of the target coating surface (e.g., a portion other than the cutting edges) with TiN. The material used for the coating is not limited to TiN as far as one can recognize a color difference between the upper surface 2 and the lower surface 3. For example, when the insert body is made of cemented carbide, it is also possible to employ bright reddish brown colored titanium carbonitride (TiCN), dark reddish brown colored titanium aluminum nitride (TiAlN), or the like.

Although the upper surface 2 of the inserts 1 of the foregoing embodiments has the hexagonal shape, the upper surface 2 may have any polygonal shape other than the hexagonal shape.

What is claimed is:

1. A cutting insert, comprising:
a polygonal shaped upper surface;
a lower surface being identical in shape to the upper surface;
a side surface connected to each of the upper surface and the lower surface; and
an upper cutting edge located at an intersection of the upper surface and the side surface, wherein
the upper surface comprises first and second corners adjacent to each other, a rake surface continuous with the upper cutting edge, and a connection surface located more inward than the rake surface and inclined toward the lower surface, an inclined angle of the connection surface is larger than an inclined angle of the rake surface,
the upper cutting edge comprises, sequentially from the first corner to the second corner, a corner cutting edge, a minor cutting edge inclined as separating from the corner cutting edge at a first inclination angle on a basis of a vertical plane perpendicular to a central axis extending between the upper and lower surfaces so as to approach the lower surface, and a major cutting edge inclined as separating from the minor cutting edge at a second inclination angle on the basis of the vertical plane so as to approach the lower surface,
the rake surface comprises a minor rake surface being continuous with the minor cutting edge and inclined as going inward at a first rake angle on the basis of the vertical plane so as to approach the lower surface, and a major rake surface being continuous with the major cutting edge and inclined as going inward at a second rake angle on the basis of the vertical plane so as to approach the lower surface, and
a cross section of the rake surface obtained by cutting an inwardly located end portion thereof along a direction of the central axis has a straight line shape or concave shape in a region crossing over at least the minor rake surface and the major rake surface.

2. A cutting insert, comprising:
a polygonal shaped upper surface;
a lower surface being identical in shape to the upper surface;
a side surface connected to each of the upper surface and the lower surface; and
an upper cutting edge located at an intersection of the upper surface and the side surface, wherein
the upper surface comprises first and second corners adjacent to each other, and a rake surface continuous with the upper cutting edge,
the upper cutting edge comprises, sequentially from the first corner to the second corner, a corner cutting edge, a minor cutting edge inclined as separating from the corner cutting edge at a first inclination angle on a basis of a vertical plane perpendicular to a central axis extending between the upper and lower surfaces so as to approach the lower surface, and a major cutting edge inclined as separating from the minor cutting edge at a second inclination angle on the basis of the vertical plane so as to approach the lower surface, and
the rake surface comprises a minor rake surface being continuous with the minor cutting edge and inclined as going inward at a first rake angle on the basis of the vertical plane so as to approach the lower surface, and a major rake surface being continuous with the major cutting edge and inclined as going inward at a second rake angle on the basis of the vertical plane so as to approach the lower surface, wherein the first rake angle of the minor rake surface is larger at an end portion thereof located closer to the second corner than that at an end portion thereof located closer to the first corner, and the second rake angle of the major rake surface is larger at an end portion thereof located closer to the first corner than that at an end portion thereof located closer to the second corner.

3. The cutting insert according to claim 2, wherein
the first rake angle of the minor rake surface is increased from the first corner to the second corner, and
the second rake angle of the major rake surface is increased from the second corner to the first corner.

4. The cutting insert according to claim 1, wherein the major cutting edge has a concave shape recessed toward the lower surface in a side view.

5. The cutting insert according to claim 1, wherein a width of the rake surface is decreased from the first corner to the second corner in a top view.

6. The cutting insert according to claim 1, wherein the upper surface further comprises a flat surface shaped upper mount part located more inward than the rake surface.

7. The cutting insert according to claim 6, wherein the upper mount part is located lower than any portion of the upper cutting edge in a side view.

8. The cutting insert according to claim 6, wherein the connection surface is located between the rake surface and the upper mount part and is continuous with each of the rake surface and the upper mount part.

9. The cutting insert according to claim 8, wherein the connection surface is inclined as going inward at a connection angle on the basis of the vertical plane so as to approach the lower surface.

10. The cutting insert according to claim 9, wherein the connection angle of the connection surface is larger than each of the first rake angle of the minor rake surface and the second rake angle of the major rake surface.

11. The cutting insert according to claim 8, wherein a width of the connection surface is decreased from the first corner to the second corner in a top view.

12. The cutting insert according to claim 1, wherein
the upper surface comprises alternately two or more major corners with a first interior angle and two or more minor corners with a second interior angle larger than the first interior angle, and
the two or more major corners comprise the first corner, and the two or more minor corners comprise the second corner.

13. The cutting insert according to claim 12, wherein the upper cutting edge comprises sequentially the corner cutting edge, the minor cutting edge and the major cutting edge as going from a first major corner of the two or more major corners to each of first and second minor corners of the two or more minor corners, each being adjacent to the first major corner.

14. A cutting tool, comprising:
a cutting insert according to claim 1 and
a holder configured to attach the cutting insert thereto, wherein
a cutting section of the upper cutting edge extending from the first corner to the second corner in the cutting insert has a positive axial rake angle.

15. A method of manufacturing a machined product, comprising:
rotating a cutting tool according to claim 14 on a basis of a rotation axis of the holder;

bringing the upper cutting edge of the cutting tool being rotated into contact with a surface of a workpiece; and
separating the cutting tool from the workpiece.

* * * * *